United States Patent
Stuckey et al.

(10) Patent No.: US 8,973,884 B1
(45) Date of Patent: Mar. 10, 2015

(54) BELT TENSIONING APPARATUS FOR SECURING A CHILD SAFETY SEAT IN A VEHICLE

(71) Applicant: Artsana USA, Inc., Lancaster, PA (US)

(72) Inventors: Joshua D. Stuckey, Leola, PA (US); Michael L. Longenecker, Lancaster, PA (US)

(*) Notice: Subject to any disclaimer, the term of this patent is extended or adjusted under 35 U.S.C. 154(b) by 0 days.

(21) Appl. No.: 13/779,406

(22) Filed: Feb. 27, 2013

Related U.S. Application Data (60) Provisional application No. 61/623,095, filed on Apr. 12, 2012.

(51) Int. Cl.
*A47C 1/08* (2006.01)
*B60N 2/28* (2006.01)

(52) U.S. Cl.
CPC ........................................ *B60N 2/28* (2013.01)
USPC ........ 248/503.1; 248/499; 248/503; 297/253; 24/68 CD (58) Field of Classification Search
CPC ...... B60P 7/0823; B60P 7/083; B60P 7/0838; A44B 11/065; A44B 11/06; A44B 11/125; A44B 11/02; B60N 2/26; B60N 2/28; B60N 2/2887; B60N 2/2806
USPC .......... 248/499, 503, 503.1; 297/253, 256.16, 297/463.1; 24/68 CD
See application file for complete search history.

(56) References Cited

U.S. PATENT DOCUMENTS

| | | | |
|---|---|---|---|
| 3,709,558 A | 1/1973 | Jakob | |
| 3,856,328 A | 12/1974 | Koizumi | |
| 4,881,303 A * | 11/1989 | Martini | 24/170 |
| 5,423,644 A * | 6/1995 | First, Sr. | 410/100 |
| 6,209,957 B1 | 4/2001 | Baloga et al. | |
| 6,273,505 B1 | 8/2001 | Carnahan | |
| 6,425,632 B1 | 7/2002 | Anthony et al. | |
| 6,539,590 B2 | 4/2003 | Ziv | |
| 6,543,846 B2 | 4/2003 | Cone | |
| 6,665,912 B2 | 12/2003 | Turner et al. | |
| 6,948,219 B2 | 9/2005 | Kakuda et al. | |
| 7,159,948 B1 | 1/2007 | Wolf | |
| 7,278,684 B2 * | 10/2007 | Boyle | 297/253 |
| 7,350,767 B2 * | 4/2008 | Huang | 254/218 |
| 7,404,239 B1 | 7/2008 | Walton et al. | |
| 7,874,047 B2 * | 1/2011 | Breeden | 24/68 CD |
| 7,887,129 B2 | 2/2011 | Hei et al. | |
| 8,444,222 B2 * | 5/2013 | Buckingham et al. | 297/253 |
| 8,651,509 B1 * | 2/2014 | Huang | 280/480.1 |
| 2002/0178766 A1 * | 12/2002 | Jackson et al. | 70/18 |
| 2008/0054691 A1 | 3/2008 | Glover | |
| 2011/0209314 A1 | 9/2011 | Miller | |
| 2011/0209315 A1 * | 9/2011 | Miller | 24/68 CD |
| 2014/0062151 A1 * | 3/2014 | Banghart et al. | 297/253 |

* cited by examiner

*Primary Examiner* — Anita M King
(74) *Attorney, Agent, or Firm* — Andrew D. Mead (57) ABSTRACT

An improved lower anchor strap tension adjusting mechanism for varying tension in a restraint connected to a vehicle. The mechanism comprises first and second adjuster ends and a length of web spanning therebetween. One end of the web is attached to one of the adjuster ends. A guide is provided on one or both adjuster ends enabling the web to be looped around the guide(s) and between the ends in multiple passes. A web lock device is connected one of the ends to engage the web and allow the length of the web spanning between the first and second adjuster portions to be fixed. The number of loops of web spanning between the adjuster ends determines the mechanical advantage in the tension force applied to the anchor strap by the adjuster compared to the tension applied to the free end, improving ease and security of safety seat installation.

16 Claims, 7 Drawing Sheets

BELT TENSIONING APPARATUS FOR SECURING A CHILD SAFETY SEAT IN A VEHICLE

CROSS-REFERENCE TO RELATED APPLICATIONS

This application claims the benefit of priority of U.S. Provisional Application 61/623,095, filed Apr. 12, 2012.

BACKGROUND OF THE INVENTION

This invention relates generally to the field of transportation safety and more particularly to child carriers for use in vehicles.

Children's car seats have made automobile travel substantially safer for children; however, as most parents are aware, properly installing such seats is typically difficult and sometimes frustrating. Installing car seats typically requires the use of cumbersome seat belt clips, the need to feed the seat belt through narrow spaces, and the need to pull as hard as possible on the end of the seat belt while putting one's full weight into the child's seat. Consequently, children's car seats are often improperly installed because adults do not understand how to properly install the car seat, will not take the time to perform the installation correctly, or are physically unable to produce the necessary leverage required to sufficiently tighten the seat belt that secures the child's seat.

Significant advantages would be realized by an improved belt-tensioning system that would enable a child's car seat to be consistently, properly installed into a vehicle.

SUMMARY OF THE INVENTION

Accordingly, the present invention, in any of the embodiments described herein, may provide one or more of the following advantages:

It is an object of the present invention to provide an improved means for connecting a child safety seat to a vehicle. The safety seat includes a base, a seat shell, and a retention means for receiving an adjustable-length lower anchor strap which is anchored to the vehicle at its ends and secured to the safety seat at an intermediate location. The anchor strap includes one or more anchor connectors for attaching to anchor fixtures in the vehicle seat (Lower Anchors and Tethers for CHildren or LATCH) and at least one tension adjusting mechanism for varying the length of and tension in the anchor strap between the anchor connectors and the safety seat. The tension adjusting mechanism comprises generally opposing first and second ends, a fixed web connector disposed at the first end, a releasable web locking device positioned at either the first or second end, an elongate length of web affixed at one end to the fixed web connector, and at least one web guide around which the web is directed prior to interfacing with the releasable web locking device. The web guide is configured to allow the web routed around and slide easily across the guide. The proximal arrangement of the fixed connector, web guide, and web locking device is such that the web is looped in a tackle arrangement between the first and second ends to increase the mechanical advantage of a tension force applied to the free end of the web. Variations in the number of loops of web spanning between the first and second ends, and the number of web guides alters the mechanical advantage in the adjusting mechanism. The web locking device engages the web in a manner allowing movement in a first direction (increasing tension) but inhibiting movement in the opposite direction unless the locking device is first released so that tension in the tension adjusting mechanism will be maintained, once established, until selectively released.

In an alternate embodiment, the anchor strap comprises a first anchor connector, commonly referred to as an anchor joint, for attaching an end of the anchor strap to the safety seat shell, a second anchor connector for attaching the anchor strap to an anchor fixture in the vehicle, and a tension adjusting mechanism for varying the length of and tension in the anchor strap between the anchor joint and anchor connector. In this embodiment, two anchor straps are necessary, one on each lateral side of the safety seat. Each tension adjusting mechanism comprises generally opposing first and second ends, a fixed web connector disposed at the first end, a releasable web locking device positioned at either the first or second end, an elongate length of web affixed at one end to the fixed web connector, and at least one web guide around which the web is directed prior to interfacing with the releasable web locking device. The web guide is configured to allow the web routed around and slide easily across the guide. The proximal arrangement of the fixed connector, web guide, and web locking device is such that the web is looped in a tackle arrangement between the first and second ends to increase the mechanical advantage of a tension force applied to the free end of the web. A web locking device engages the web to allow movement in a first direction (increasing tension) but inhibits movement in the opposite direction unless the locking device is first released so that tension in the tension adjusting mechanism will be maintained, once established, until selectively released.

It is a further object of the present invention to provide an improved means for connecting a child safety seat to a vehicle that ensures adequate tension in a seat anchor strap and can be easily and consistently tensioned by a user when installing the safety seat into a vehicle. A tension adjusting mechanism is provided in a safety seat anchor strap comprising a first adjuster end, a second adjuster end, and a length of web spanning between the two adjuster ends in a looped arrangement. The lower anchor strap is directed through a fixture in the safety seat that restrains the strap in a manner to prevent detachment from the safety seat but allows limited axial movement for adjustment. One end of the web is attached to a web connector on one of the adjuster ends. At least one of the adjuster ends, and preferably both, include a slide or roll guide around which the web is looped in a tension-multiplying tackle arrangement. The non-attached free end of the web is directed through a locking device disposed on one of the adjuster ends which allows the web to pass in one direction while preventing movement of the web in the opposite direction. Securing the safety seat to a vehicle requires connecting the ends of the anchor strap to LATCH anchor connections provided in the vehicle and pulling the free end of the web in the tension adjusting mechanism to shorten the separation between the first and second adjuster ends. The result is to shorten the overall lower anchor strap length, tension the anchor strap, and secure the safety seat in the vehicle. The numbers of web loops between the first and second adjuster ends determines the mechanical advantage a tension applied to the free end of the web produces in the anchor strap tension force securing the safety seat to the vehicle. The locking device, such as a cam-lock for a web, allows the web to be tensioned and to hold that tension. A release allows the web to be de-tensioned so that the safety seat may be removed.

It is a still further object of the present invention to provide an improved tension adjuster means for a lower anchor strap used to secure a child safety seat to a vehicle that is durable in construction, inexpensive of manufacture, carefree of maintenance, easily assembled, and simple and effective to use.

These and other objects are addressed by an improved child safety seat lower anchor strap adjuster affixed to the safety seat that includes one or more anchor connectors for attaching to LATCH anchor fixtures in a vehicle and at least one adjuster mechanism for varying the length of and tension in the anchor strap. One or more strap adjusters are provided, each comprising a first adjuster portion, a second adjuster portion, and a length of web spanning between the two adjuster portions. One end of the web is attached to one of the adjuster portions. A slide or roll is provided on one or both adjuster portions which enable the web to be looped around the roll(s) and between the adapter portions in multiple passes. A lock device is connected to the first or the second adjuster portion to engage a free end of the web and allow the length of the web spanning between the first and second adjuster portions to be fixed. By varying the number of loops of web spanning between the first and second adjuster portions, the mechanical advantage in the tension force applied to the anchor strap by the adjuster over the tension applied to the web free end allows the safety seat to be more easily and securely installed in the vehicle.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience, and are determined as the safety seat would normally be installed in a vehicle. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
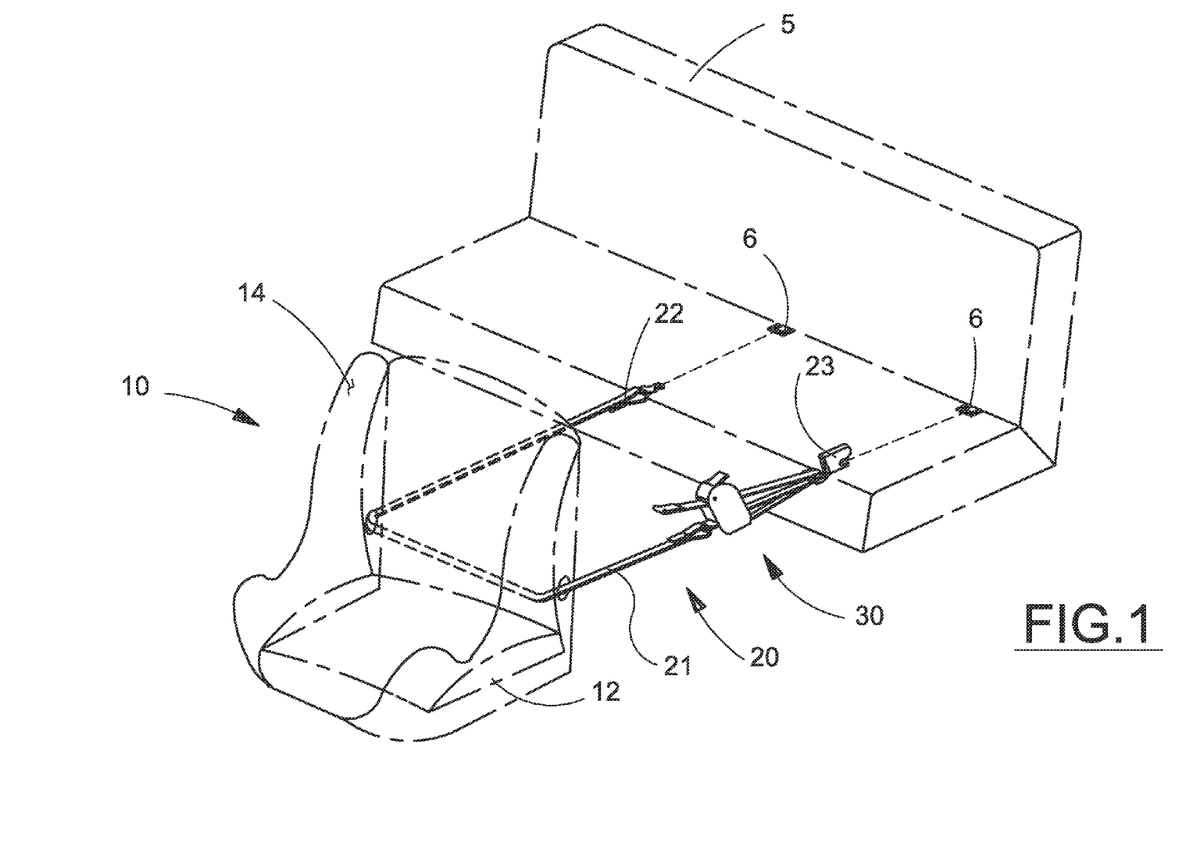
FIG. 1 is a perspective view of a child safety seat as it is typically installed for use in a vehicle.

A child safety seat 10 for installation in a vehicle seat 5 is shown in FIG. 1 comprising a base 12 and a seat shell 14. Soft goods (not shown) traditionally cover the seat shell 14 for occupant comfort. Harness belts (not shown) connected to the seat shell restrain the occupant within the seat for protection. The safety seat 10 is configured to be selectively secured into a vehicle using a first embodiment of a lower anchor strap 20 which is affixed to the seat shell 14 or the seat base 12, and LATCH anchors 6 provided in the vehicle seat. The anchor strap 20 is preferably secured to the safety seat by a clamp or the like which allows axial movement of the strap in relation to the seat shell 14, but precludes detachment of the strap from the safety seat.

Lower anchor strap 20 preferably comprises a length of web 21 with anchor strap connectors 22, 23 at each end configured to engage lower LATCH anchors 6 commonly provided in the vehicle seat. Lower anchor strap 20 is also provided with a tension adjusting mechanism 30 to allow the length of and tension in the anchor strap 20 to be adjusted so that the safety seat can be securely held in position by tension in the anchor strap which compresses the safety seat into the vehicle seat.

Figure 7:
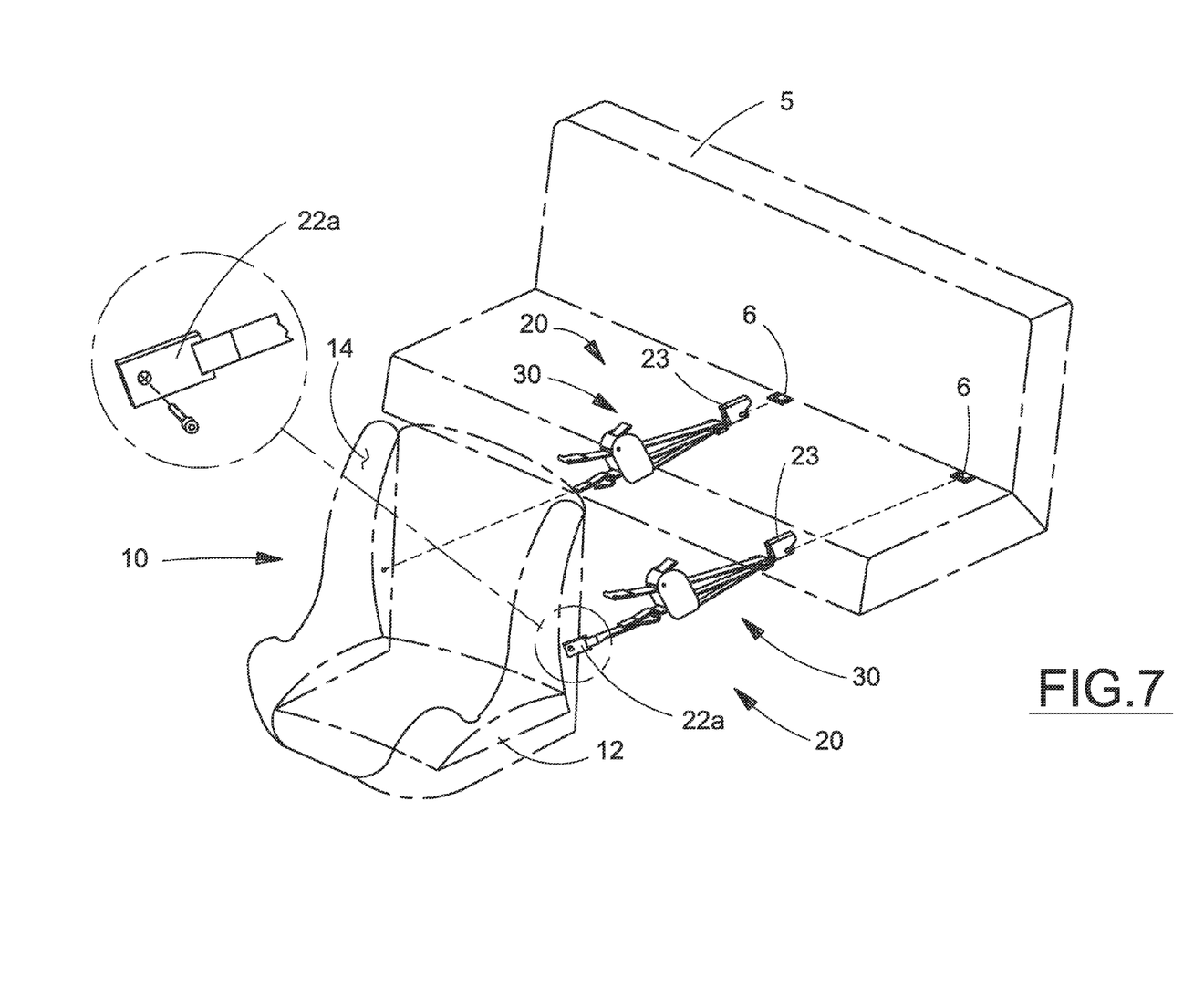
FIG. 7 is a perspective view of a child safety seat employing a second embodiment of the present invention to install the safety seat for use in a vehicle.
Figures 8, 9, 10:
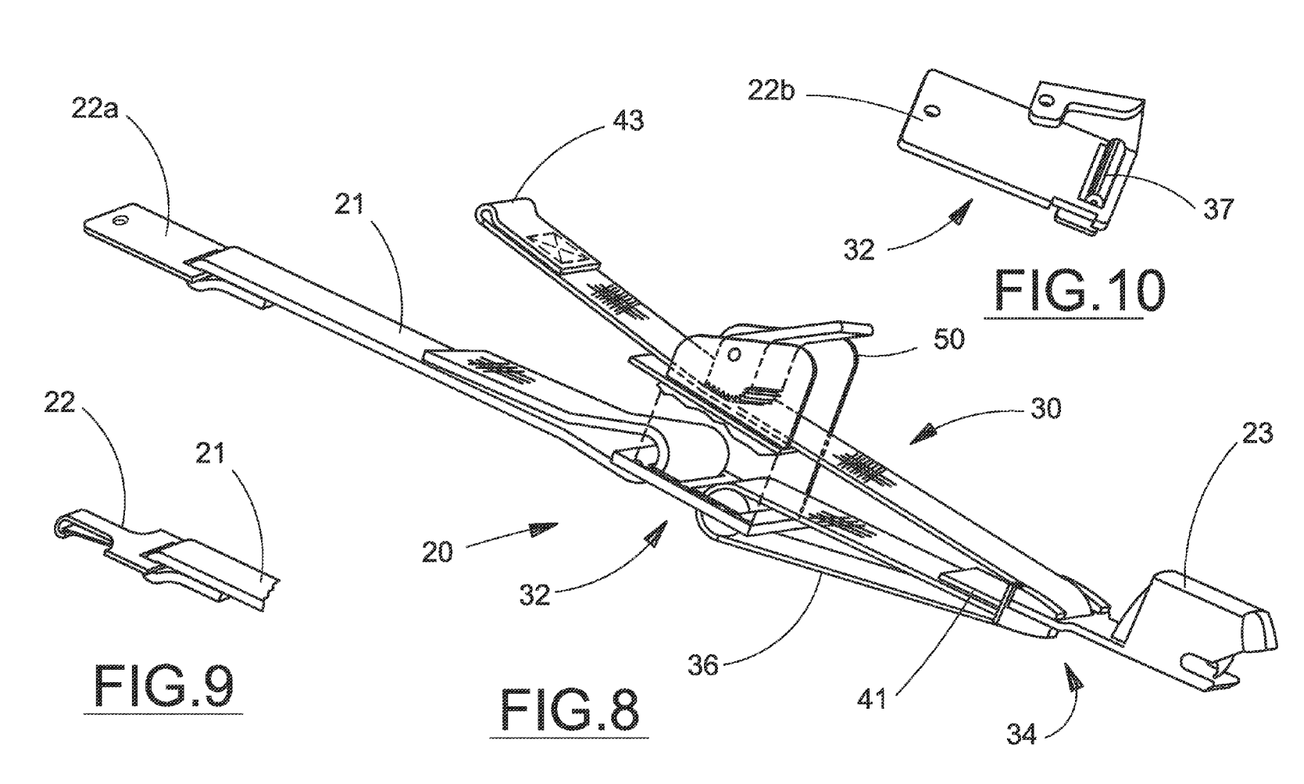
FIG. 8 is a perspective view of a lower anchor strap having a second embodiment of the tension adjusting mechanism of the present invention.
FIG. 9 is a first alternate connection embodiment of an anchor connector for the anchor strap.
FIG. 10 is a second alternate connection embodiment of an anchor connector for attaching the anchor strap to the safety seat.

An alternate embodiment the anchor strap 20 is shown in FIGS. 7 and 8 and comprises a first anchor connector 24 for attaching an end of the anchor strap 20 to the safety seat shell 14, a second anchor connector 23 for attaching the anchor strap 20 to an anchor fixture 6 in the vehicle, and a tension adjusting mechanism 30 for varying the length of and tension in the anchor strap between the anchor connectors. In this embodiment, two anchor straps 20 are necessary, one on each lateral side of the safety seat 10. A pair of tension adjusting mechanisms 30 is provided in this embodiment, one disposed on each side of the safety seat shell 14.

Figure 2:
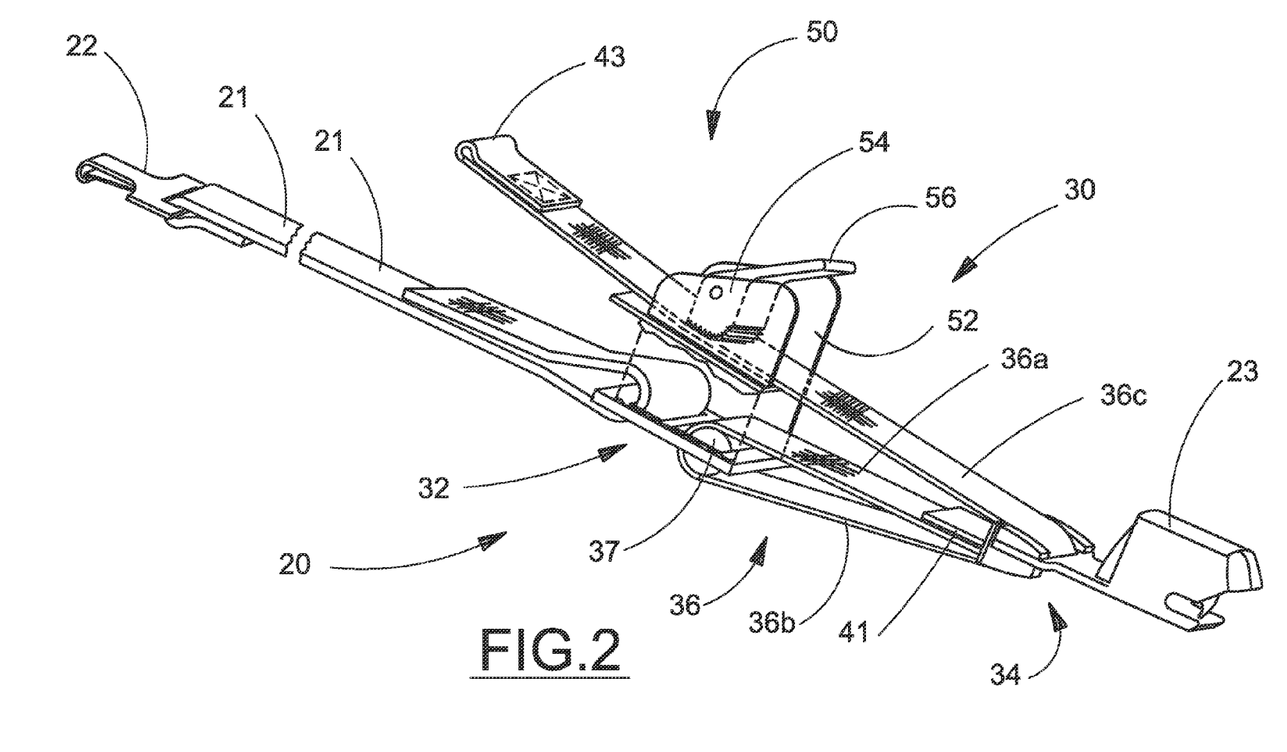
FIG. 2 is a perspective view of a lower anchor strap having a tension adjusting mechanism embodying the present invention.
Figure 3:
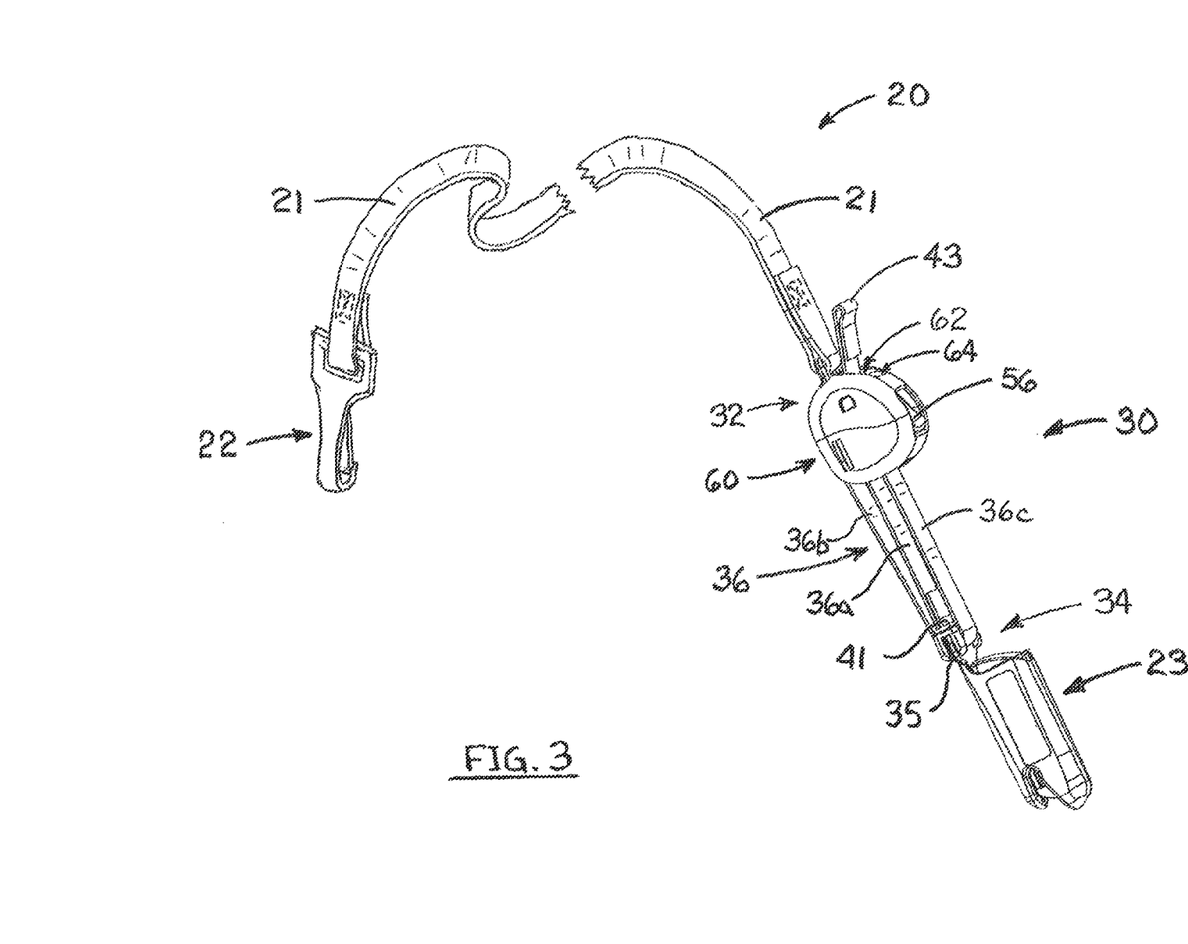
FIG. 3 is a second view of the lower anchor strap shown in FIG. 2.
Figures 4, 5, 6:
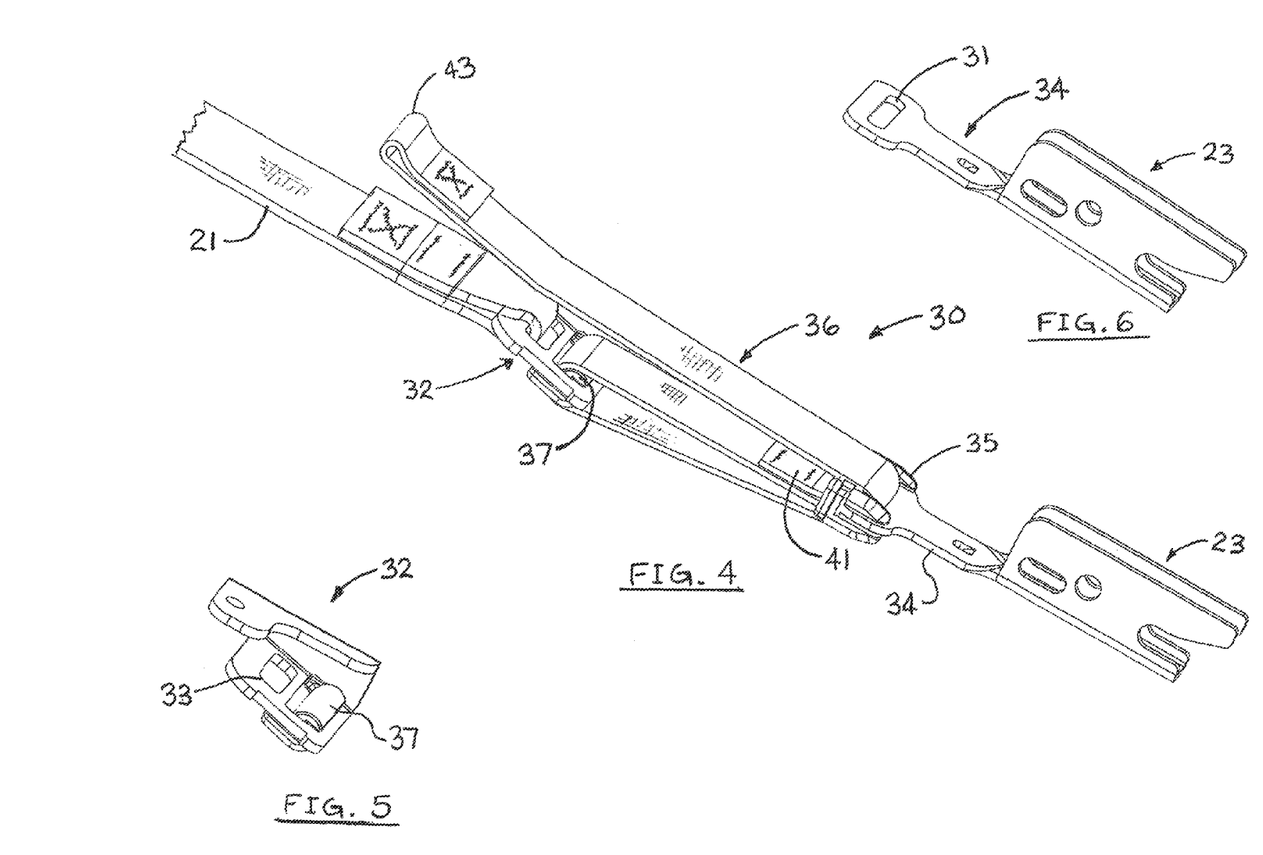
FIG. 4 is a partial perspective view of the lower anchor strap of FIG. 2 with portions of the tension adjuster mechanism removed for clarity.
FIG. 5 shows a first of the adjuster end portions of the tension adjusting mechanism with the outer covering removed to show the internal structure.
FIG. 6 show a portion of a second of the adjuster end portions with the outer covering removed to show the internal structure.

Referring to FIGS. 4 through 6, the tension adjusting mechanism 30 comprises a first adjuster end portion 32, a second adjuster end portion 34, and a length of web, also referred to as an adjuster strap 36. The adjuster end portions 32, 34 each include a guide 35, 37 around which the adjuster strap 36 is directed so that it loops back and forth between the adjuster portions 32, 34, much in the manner of a block-and-tackle pulley system. A fixed end 41 of the adjuster strap 36 is connected to one of the adjuster end portions 32, 34 at a fixed web connector 31, (an aperture in the illustrated embodiment); the opposite (free) end 43 of the adjuster strap 36 is free so that it may be pulled by a user while installing the safety seat into a vehicle. Mechanical advantage of the input tension applied to free end 43 is based on the number of loops 36a, 36b, 36c between the guides 35, 37 disposed in the adjuster end portions 32, 34 which are acting on the moving end portion. In the embodiment shown in FIGS. 2-4, the moving portion is end 32, loops 36a and 36b are applying forces onto the moving end portion 32, resulting in a tightening tension applied by the adjuster 30 that is generally double the tension applied to the free end 43, discounting friction and other losses in the arrangement. Other configurations are permissible and are arranged by relocation of the fixed end 41 or changing the number of loops 36a, 36b, 36c made by the adjuster strap 36 or by changing the direction of pull of the free end 43.

In the embodiment shown in FIGS. 2-6, one of the anchor strap connectors 23 is connected directly to second adjuster end portion 34 to maintain the adjuster mechanism 30 ideally positioned in relation to the seat shell 14. A skilled artisan will notice that the same function and result may be accomplished by using a short length of flexible web or the like to connect the second adjuster end portion 34 and the anchor strap connector 23. It is also noted that connectors 22, 23 may be dissimilar, as shown in the figures, or that the same connector style may be used at each end. The design of connector 23, for example, eases connection to and disconnection from the vehicle lower LATCH anchor through the inclusion of a handle extension and remote release mechanism while connector 22 requires the user to grasp the connector in the limited space typically adjacent to most vehicle lower anchors. The first adjuster end portion 32 is provided with a connection fixture 33 (aperture) through which an end of the anchor strap 21 may be affixed.

The tension adjusting mechanism 30 also includes a belt locking device 50 attached to one of adjuster end portions, first adjuster end portion 32 in the figures. Belt locking device 50 engages the adjuster strap 36 in a manner permitting the strap to move/slide through the device in one direction, but prevents sliding movement of the adjuster strap 36 in the opposite direction. One such locking device, commonly known as a cam-lock, includes a belt guide 52 to position the belt and limit belt movement to axial within the guide, and a spring-loaded pivoting cam 54 which traps the belt in the belt guide when engaged, and a release 56 which allows the cam to be pivoted toward a release position by a user. Pivoting the cam 54 releases the adjuster belt 36 and allows it to move freely in either direction within the belt guide 52. The cam lock is arranged so that the adjuster belt 36 may be pulled in the direction that increases tension in the adjuster mechanism, reducing the separation between the first and second adjuster portions without restriction from the cam lock, but prevents reverse movement of the adjuster belt unless the user releases the cam. In this manner, the locking device will allow tension in the anchor strap 20 to be increased to securely position the safety seat in the vehicle and maintain that tension until the user releases the locking device to remove or adjust the safety seat. There are numerous functionally equivalent belt locking mechanisms that may be employed within the scope and spirit of the invention.

Other alternative embodiments in which the anchor strap 20 is connected between the safety seat shell 14 and the LATCH anchors 6 are shown in FIGS. 8-10. In FIG. 8, a short length of webbing 21 is included between the tension adjusting mechanism 30 and the anchor strap connector 22. In this embodiment, the anchor strap connector 22a is configured to be connected by bolting or riveting to the structure of the safety seat shell. Alternatively, a clip-type connector 22 as shown in FIG. 9 could be used to connect to a corresponding loop connector on the safety seat shell, though such an arrangement might not meet current safety regulations. In FIG. 10, the short length of webbing 21 is eliminated and the first adjuster end portion 32 is provided with an anchor connector 22b which is configured to be connected by bolting or riveting to the structure of the safety seat shell. It is noted that including a short length of flexible webbing is preferred for improved installation flexibility.

Figures 11, 12, 13:
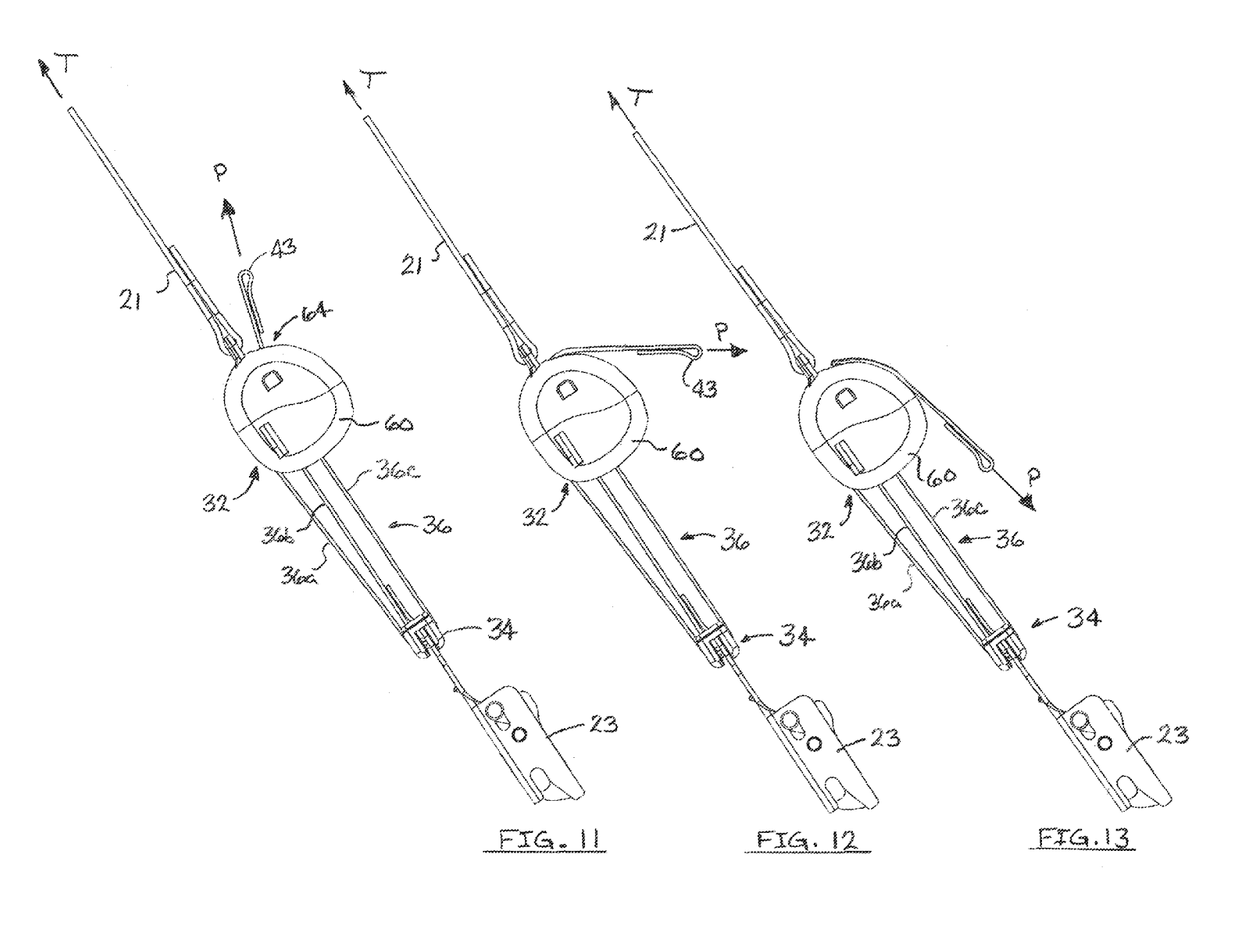
FIGS. 11-13 illustrate changes in tension multiplication created as the direction to which tension is applied to a free end of a tensioning web is altered.

A housing 60 may be provided to cover the locking device 50. While the housing is primarily aesthetic, the opening 62 through which the free end 43 of the adjuster belt may include a rounded surface 64 adjacent to the opening to provide the equivalent of an additional roll 35 on the end portion 32. The additional roll guide equivalent allows an additional loop (36c) of the adjuster strap 36 to apply tension force on the moving end portion 32. As shown in FIGS. 11 through 13, by altering the direction at which a pull tension "P" is applied to free end 43, the mechanical advantage in producing anchor tension "T" can be varied. As previously described, the tensioning arrangement shown in FIG. 11 results in anchor tension "T" being generally twice the magnitude of pulling tension "P." In FIG. 12, the anchor tension "T" is greater than twice the pulling tension "P" owning to a portion of the pulling tension being applied to the moving end portion 32. And in FIG. 13, the full effect of the pulling tension "P" is now applied to the moveable end 32 such that the tension force is loop portion 36c is fully applied, resulting in an anchor tension "T" that is generally four times the pulling tension "P."

The invention as described is not limited to the foregoing embodiments, but it can also be modified in many ways without departing from the basic concepts. Multiple tension adjusting mechanisms may be employed in a single anchor strap (e.g., one adjacent to each anchor strap connector), the tension adjusting mechanism may be connected by a length of anchor strap to both end connections, or anchors straps with tension adjusting mechanisms may be connected directly to the safety seat shell or frame at one end. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A tension adjuster for a restraint for securing a child safety seat to first and second seat anchors in a vehicle, comprising:

a first seat anchor connector for connecting to the first seat anchor;

a second seat anchor connector for connecting to the second seat anchor; and an anchor member interconnecting said first and said second seat anchor connectors, said anchor member having a tension adjusting mechanism for adjusting a restraint tension force between said first and said second anchor connectors, said tension adjusting mechanism further comprising:

a fixed web connector;

a releasable web connector having a locked position and an unlocked position;

spaced apart first and second guides;

a third guide; and an elongate tension web having a fixed end and a free end, said fixed end attached to said fixed web connector, said tension web trained around said first and second guides so as to multiply tension forces applied to said free end, said tension web further interfacing with said releasable web connector for movement in a tensioning direction to increase a first tension force applied to said free end resulting in said restraint tension force between said first and said second seat anchor connectors that is greater than said first tension force, said tension web further being selectively trainable around said third guide in a manner to further multiply said tension force applied to said free end to cause a second restraint tension force greater than said restraint tension force.

2. The tension adjuster of claim 1, wherein said first and said second guides are rollers around which said tension web is directed.

3. The tension adjuster of claim 1, wherein said first and said second guides are fixed rounded surfaces around which said tension web is directed.

4. The tension adjuster of claim 1, wherein said tension adjusting mechanism is connected to said first seat anchor connector.

5. The tension adjuster of claim 1, wherein said releasable web connector is a cam-lock mechanism permitting movement of said tension web in said tensioning direction, but inhibiting movement of said tension web in an opposite direction when in said locked position, and permitting movement of said tension web in either direction when in said unlocked position.

6. The tension adjuster of claim 1, wherein said restraint tension force exceeds said first tension force generally by at least a factor of two.

7. A tension adjuster for securing a child safety seat to a vehicle, comprising:
    a first seat anchor connector;
    a second seat anchor connector;
    a tension adjusting mechanism connecting said first and second seat anchor connectors for adjusting a restraint tension force between said anchor connectors, said tension adjusting mechanism further comprising:
        a fixed web connector;
        a releasable web connector having a locked position and an unlocked position;
        spaced apart first and second guides;
        a third guide disposed adjacent to the releasable web connector; and
        an elongate tension web having a fixed end and a free end, said fixed end attached to said fixed web connector, said tension web trained around said first and second guides so as to multiply tension forces applied to said free end, said tension web further interfacing with said releasable web connector for movement in a tensioning direction to increase a first tension force applied to said free end resulting in said restraint tension force between said first and said second seat anchor connectors that is greater than said first tension force, said tension web further being selectively trainable around said third guide in a manner to further multiply said tension force applied to said free end to cause a second restraint tension force greater than said restraint tension force.

8. The tension adjuster of claim 7, wherein said first seat anchor connector is attached to the child safety seat.

9. The tension adjuster of claim 8, wherein the magnitude of said restraint tension force is generally at least twice said first tension force.

10. The tension adjuster of claim 9, wherein said releasable web connector is a cam-lock mechanism permitting movement of said tension web in said tensioning direction, but inhibiting movement of said tension web in an opposite direction when in said locked position, and permitting movement of said tension web in either direction when in said unlocked position.

11. An adjustable restraint for securing a child safety seat to first and second seat anchors in a vehicle comprising:
    a first seat anchor connector for connecting to the first seat anchor;
    a second seat anchor connector for connecting to the second seat anchor;
    an anchor web member connecting said first and said second seat anchor connectors;
    a releasable web connector having a locked position and an unlocked position; and
    a tension adjusting mechanism further comprising:
        a fixed web connector having a first guide disposed thereon;
        a releasable web connector having a second guide disposed thereon;
        a third guide disposed on the releasable connector; and
        an elongate tension web having a fixed end attached to the fixed web connector and a free end, the tension web trained around the first and second guides in a manner to multiply a tension force applied to the free end to cause a first restraining force between the first and second anchor connectors that is greater than the tension force, the tension member further being selectively trainable around the third guide in a manner to further multiply the tension force applied to the free end to cause a second restraining force greater than the first restraining force.

12. The adjustable restraint of claim 11, wherein the third guide is configured to permit the tension web to be selectively angled relative to the releasable connector as the tension force is applied thereby altering the degree to which the tension web engages the third guide and enabling the second retaining force to be selectively altered.

13. The adjustable restraint of claim 12, wherein the tension may be selectively angled relative to the releasable connector through a range of approximately 180 degrees.

14. The adjustable restraint of claim 13, wherein the releasable web connector is a cam-lock mechanism permitting movement of the tension web in a tensioning direction, but inhibiting movement of said tension web in an opposite direction when in the locked position, and permitting movement of the tension web in either direction when in the unlocked position.

15. The adjustable restraint of claim 14, wherein the first restraining force is approximately twice the tension force.

16. The adjustable restraint of claim 14, wherein the second restraining force may be up to four times twice the tension force.

* * * * *